Patented July 17, 1951

2,560,956

UNITED STATES PATENT OFFICE 2,560,956

MINERAL OIL COMPOSITIONS CONTAINING POLYMERS OF THIOPHENE

George C. Johnson, Woodbury, N. J., assignor to Socony-Vacuum Oil Company, Incorporated, a corporation of New York No Drawing. Application May 3, 1947, Serial No. 745,725

6 Claims. (Cl. 252—45)

This invention relates to certain polymerization products of thiophene and of alkyl-substituted thiophenes formed in the presence of solid silica-alumina catalysts. It also includes lubricating compositions improved by the addition thereto of minor proportions of the new polymers.

Prior to this invention, thiophene and its alkyl derivatives have been polymerized by the use of sulphuric acid or other strong acids, such as dihydroxyfluoboric acid, but there resulted black, granular, and relatively insoluble products, quite different from the products of the present invention.

According to the present invention it has been discovered that thiophene or alkyl-substituted thiophenes will polymerize in the presence of solid silica-alumina catalysts at temperatures ranging from about 20° C. to about 200° C., in a period of time ranging from about 1 hour to about 20 days, depending upon the reactant and the catalyst used. Such polymerization will result in the production of an oil, resin or crystalline solid of a type quite different from those produced by the treatment of thiophene or alkyl-substituted thiophenes with strong acids, in accordance with prior practices.

REACTANTS

The polymerization products of this invention may be prepared from thiophene itself, or from any of its monoalkyl derivatives. 2-methyl thiophene, 3-methyl thiophene, 2-isopropyl thiophene, 2-t-butyl thiophene, 2-t-amyl thiophene, 2-s-butyl thiophene, 2-s-hexadecyl thiophene and the mixed alkyl thiophenes derived from the olefins of cracked wax or from other sources may be mentioned by way of non-limiting examples. The starting material may be either a single one of these compounds or a mixture of two or more thereof. Polyalkyl-substituted thiophenes may be used also as the starting material but it has not been ascertained whether or not they polymerize as such, or break down into monoalkyl thiophenes and olefins during the reaction. It appears possible that they do break down into monoalkyl thiophenes during the reaction and that the olefins produced react with the product to at least partially alkylate it.

Other substituents than alkyl radicals may be present in the thiophene ring provided, of course, that they are substituents that do not otherwise interfere with the reaction. Such materials as 2-acetylthiophene and thiophene-3-thiol are examples of materials of this type that have been found to be useful.

In the examples, a typical, treated natural silica-alumina catalyst has been used, and also a synthetic silica-alumina catalyst. Both function satisfactorily. It appears that many typical silica-alumina catalysts, such as those used for the cracking of petroleum oils, will accomplish the desired catalysis.

REACTION CONDITIONS

The reaction may be accomplished either batchwise or continuously. One batch method consists in stirring the reactant and catalyst at a fixed temperature for the required period of time. The liquid is then filtered from the catalyst and distilled. The desired product either remains as a residue or is distilled over at reduced pressure as a high boiling distillate.

A solvent, such as benzene, may be added before filtering to remove the catalyst, or the catalyst, after filtration, may be washed with benzene or other solvents to remove as much as possible of the product. Relatively large quantities of catalyst, about ½ part by weight to each part by weight of reactant may be used. Such a mixture is easily stirred and gives a relatively large yield of product.

A second batch method utilizes even larger amounts of catalyst, about 1 part by weight of catalyst to 1 part by weight of reactant. The liquid and solid are mixed and merely allowed to stand in the reactor at a fixed temperature for a fixed length of time, or mixed, not by a stirrer, but by an apparatus resembling a cement mixer or tumbler. The consistency of the reaction mixture resembles mud or plaster rather than a liquid containing suspended solids, as in the case of the first batch method of operation. In the second method of operation it is essential that a solvent, such as benzene, be used in order to recover a high yield of product.

A continuous overflow method of operation consists in moving the reactant in a closed cycle into contact with or through the catalyst. Additional reactant may be continuously added to the cycle at one point and a corresponding volume of product and unreacted material continuously removed at another point. The remaining material may be distilled to recover the polymerized product. The unreacted material from this distillation may also be returned to the mixing cycle.

The reaction may also be accomplished continuously by percolation, that is, by passing the reactant through a bed of catalyst at a rate of flow and at a temperature adjusted to give a high yield of product. Unreacted material may be recycled to obtain maximum conversion. A minor evolution of hydrogen sulphide gas occurs, but there is very little indication of the occurrence of any important side reactions.

The new materials are oils, resins or crystals, depending upon the reactant, the catalyst and the conditions of reaction. They are useful as intermediates in the manufacture of other chemicals, as plasticizers, as components of rubber and other viscous, plastic or solid masses, as coatings, as insecticides, and as components of lubricating compositions.

Further details and advantages of this invention will be apparent from the following specific examples. For easy comparison, the results of a number of examples are set forth in the following table.

The term "Super Filtrol" is a trade name for an acid-treated natural montmorillonite clay that has been used as the catalyst in most of the examples. The term "Beads" is used to designate a silica-alumina catalyst formed from a true hydrogel and containing approximately 90% $SiO_2$ and 10% $Al_2O_3$. In each case the bead catalyst is powdered before use by grinding until it passes through a 140-mesh screen.

The methods of preparation of the reaction products follow the methods described above.

tated by the addition of water to a hot solution with subsequent cooling. White crystals melting at 105° C. were obtained. They had a molecular weight by the cryoscopic method, using cyclohexane as the solvent, of 395 and contained 22.3% sulphur. A trimer of the tertiary-butylthiophene would have theoretically a molecular weight of 420 and would contain 22.9% sulphur. The uncertainties of the analyses are such that the results are not inconsistent with the view that the white crystalline product is a trimer of 2-t-butylthiophene.

Example II 100 parts by weight of tertiary-butylthiopene and 81 parts by weight of Super Filtrol were mixed to make a thin paste. The mixture was heated to 75° C. to 80° C. for six days. At the end of this time the mixture was cooled to 30° C. and enough petroleum ether added to make a slurry. The solid clay was filtered off; the filtrate was distilled until the pot temperature had reached 240° C. at atmospheric pressure. 55 parts by weight of clear, pale yellow oil were recovered as a residue. This oil had a refractive index of 1.5526, whereas the starting material had a refractive index of 1.4992. This oil had a kinematic viscosity at 100° F. of 22.63 centi-

Table

| Example No. | Alkyl Subst. | Catalyst | Catalyst Reactant Ratio (Wt.) | Mode of Operation | Temp. °C. | Time | Agitation | Yield, Weight, Per Cent |
|---|---|---|---|---|---|---|---|---|
| I | 2-t-butyl | Super Filtrol | 0.8 | Batch | 25–30 | 18 days | None | 32 |
| II | do | do | 0.8 | do | 80 | 6 days | do | 55 |
| III | do | do | 1.0 | do | 80 | 4 days | do | 48 |
| IV | do | do | 1.2 | do | 150-170 | 16 Hours | do | 69 |
| V | do | do | 0.2 | do | 25–30 | 25 Days | Stirred | 6 |
| VI | do | 85% $H_3PO_4$ | 0.2 | do | 25–30 | do | do | 0 |
| VII | 2-methyl | Super Filtrol | 0.2 | do | 25–30 | 14 Days | do | 41 |
| VIII | do | do | 1.1 | do | 25–30 | 13 Days | None | 88 |
| IX | do | do | 1.1 | do | 80 | 2⅔ Days | do | 93 |
| X | do | do | 0.17 | Continuous with recycle | 92–97 | 5 Hours | | 45 |
| XI | do | do | 0.1 | Continuous Percolation | 95–100 | 1 Hour | | 44 |
| XII | do | do | 0.2 | Continuous Overflow | 100 | do | Stirred | 39 |
| XIII | Thiophene only | do | 0.8 | Batch | 80 | 3 Days | None | 30 |
| XIV | 3-methyl | do | 0.2 | do | 25–30 | 25 Days | do | 4 |
| XV | do | do | 1.1 | do | 80 | 5 Days | do | 81 |
| XVI | 2,5-di-t-butyl | do | 1.1 | do | 80 | 6 Days | do | 0 |
| XVII | do | do | 0.5 | do | 174-183 | 14 Hours | Stirred | 16 |
| XVIII | 2-t-butyl | do | 0.93 | do | 80 | 4 Days | None | 75 |
| XIX | do | Muffled Super Filtrol | 0.90 | do | 80 | do | do | 75 |
| XX | do | Powdered Beads | 0.74 | do | 80 | do | do | 7 |
| XXI | do | Muffled Powdered Beads | 0.78 | do | 80 | do | do | 24 |

COMMENTS ON ABOVE EXAMPLES

Example I

A small portion of 2-t-butylthiophene was mixed with enough Super Filtrol so that the liquid level was just barely above the solid level. This corresponds to about 0.8 part by weight of Super Fitrol for each part by weight of 2-t-butylthiophene. The mixture was allowed to stand for 18° days at room temperature (about 30° C.). The original product had an index of refraction at 20° C. for the sodium D line of 1.4992, whereas the reaction product had an index of refraction of 1.5183, indicating that substantial reaction had occurred. The total product was distilled to remove unreacted tertiary-butylthiophene and 15 ml. were recovered, no lower boiling material being observed. The distillation ceased abruptly when all of the tertiary-butylthiophene had been vaporized. The entire residue was collected. It had a refractive index of 1.5555 and amounted to 7 ml. (32 wt. %). Overnight the material solidified. It was dissolved in ethanol and reprecipistokes and at 210° F. of 3.21 centistokes. The viscosity index was minus 104. Blends of this material were made in a conventional solvent refined Pennsylvania-Mid-Continent mineral oil and oxidation tests run in the presence of a cadmium-silver bearing.

| Weight Per Cent Product of Example II | Loss in Weight of Bearing Mg. |
|---|---|
| 0 (Blank) | 22 |
| ½ | 0 |
| 1 | 0 |
| 2 | 0 |

These results indicate that this polymerization product improves the stability of the lubricating oil.

Example III 400 parts by weight of t-butylthiophene and 423 parts by weight of Super Filtrol were mixed to a mud and heated at 75–80° C. for four days. At the end of this time, the mixture was cooled and benzene added to make a slurry. The clay was filtered off and the filtrate distilled to remove benzene and unreacted t-butylthiopene. On further distillation the entire product was distilled, two main fractions being noted, a viscous oil (106 parts by weight) at 170–210° C. pot temperature and 0.4 mm. of mercury pressure and a resinous material (85 parts by weight) at 220–250° C. at 0.2 mm. of mercury pressure. The two distillation cuts were recombined to give 191 parts by weight of viscous oil, a yield of 48% by weight of the t-butylthiophene charged. Blends of this material were made in a conventional solvent-refined Pennsylvania-Mid-Continent mineral oil and oxidation tests run in the presence of a cadmium-silver bearing.

| Weight Per Cent Product of Example III | Loss in Weight of Bearing |
|---|---|
| | Mg. |
| 0 | 22 |
| ½ | 0 |
| 1 | 0 |
| 2 | 0 |

Example IV 100 parts by weight of t-butylthiophene and 122 parts by weight of Super Filtrol were mixed to a mud in a closed vessel. The reactor was equipped with an outlet tube leading to a scrubber containing a solution of lead acetate in water to catch any hydrogen sulphide given off in the reaction. The mixture was heated for 16 hours at 150–170° C. At the termination of this time air was blown into the reactor to carry any remaining hydrogen sulphide into the scrubber. In addition to the outlet for the hydrogen sulphide, provision was made for collecting low boiling material which escaped from the hot reactor. On redistillation of this low boiling material it was found that about one part by weight of thiophene (B. P. 84° C.) had been formed. The precipitate of lead sulphide in the scrubber was collected, dried and weighed. From its weight it was calculated that about 2 parts by weight hydrogen sulphide had been formed in the reaction. The material in the reactor was cooled, made into a slurry with benzene and filtered. On distillation of the filtrate, 13 parts by weight of t-butylthiophene were recovered and 69 parts by weight of green viscous oil were obtained. The material balance was:

| In | Out | |
|---|---|---|
| t-butylthiophene 100 | Hydrogen sulphide | 2 |
| | Thiophene | 1 |
| | t-butylthiophene | 13 |
| | Product | 69 |
| | Handling Loss | 15 |
| | | 100 |

The evolution of hydrogen sulphide was more notable at 150–170° C. than at any lower temperature. It was concluded that hydrogen sulphide evolution is not an essential part of the main reaction but is rather an indication of a side reaction. When the product made above had been allowed to stand at room temperature for some time an odor of hydrogen sulphide was noted.

Example V 100 parts by weight of t-butylthiophene and 20 parts by weight Super Filtrol were stirred together at 25–30° C. for 25 days. In these proportions the clay forms a fine suspension while stirring and settles rapidly when the stirring is interrupted. At the end of this time the refractive index of the liquid had risen from 1.4992 to 1.5049. On distilling to a pot temperature of 300° C. at atmospheric pressure, 6 parts by weight of pale brown oil were recovered. These results may be compared with Example I.

| Run | Example I | Example V |
|---|---|---|
| Temperature, °C | 25–30 | 25–30 |
| Time, days | 18 | 25 |
| Gms. catalyst/gm. reactant | 0.8 | 0.2 |
| Increase in Refractive Index | .0191 | .0057 |
| Yield, weight percent | 33 | 6 |

It is to be noted that although the time was more favorable in Example V, nonetheless a smaller yield was obtained due to the lesser quantity of catalyst used.

Example VI

When 100 parts by weight of t-butylthiophene were stirred with 20 parts by weight of 85% phosphoric acid for 25 days, no increase in refractive index of the t-butylthiophene was noted, indicating that no reaction had occurred.

This run illustrates that polymerization catalysts in general, of which 85% phosphoric acid is a member, do not necessarily serve as catalysts for the polymerization of alkyl thiophene under conditions where certain materials, e. g., silica-alumina catalysts, do serve.

Example VII 100 parts by weight 2-methylthiophene and 20 parts by weight Super Filtrol were stirred together at 25–30° for 14 days. The refractive index of the liquid rose from 1.5196 to 1.5582 meanwhile. On distillation to remove 2-methyl thiophene, 41 parts by weight of a clear, light brown viscous oil were recovered. This oil had a refractive index of 1.6030.

It is to be noted that under similar conditions of catalyst to reactant ratio and temperature, the 2-methylthiophene was more reactive than t-butylthiophene, the yields being respectively 41 wt. percent in 14 days and 6 wt. percent in 25 days.

Example VIII 100 parts by weight of 2-methylthiophene and 107 parts by weight of Super Filtrol were mixed to a thick mud and allowed to stand for 13 days at 25–30° C. An odor of hydrogen sulphide was noted in the reactor. Benzene was added to the reaction mixture to form a slurry. The clay was filtered off. The filtrate was distillated to remove benzene and unreacted 2-methylthiophene. 88 parts by weight of clear, pale yellow oil were obtained.

In comparison with Example VII it is noted that the increase in catalyst to reactant ratio from 0.2 to 1.1 has increased the yield from 41 to 88% by weight.

A blend was made of 1% by weight of the product of this example in a conventional solvent-refined Pennsylvania-Mid-Continent mineral oil. An oxidation test was run in the presence of a cadmium-silver bearing.

| Sample | Loss in Weight of Bearing |
|---|---|
| | Mg. |
| Oil alone | 21 |
| Oil +1 % Product of Example VIII | 0 |

These results show that this product made from 2-methylthiophene improves the oxidation stability of mineral oil.

Example IX 100 parts by weight 2-methylthiophene and 106 parts by weight Super Filtrol were mixed and heated at 80° C. for 64 hours. The mixture was cooled to 30° C. and benzene added to make a slurry. The clay was filtered off and then extracted with acetone and refiltered. The filtrates were combined and distilled to remove acetone, benzene and unreacted 2-methylthiophene. 93 parts by weight of a light brown cloudy viscous oil were obtained as the distillation residue.

Example X

A reactor was filled with 17 parts by weight of Super Filtrol and 100 parts by weight of 2-methylthiophene were passed downward through the reactor at a temperature of 92–97° C. The product was continuously distilled and the unreacted 2-methylthiophene recycled to the reactor. The reaction was continued for 5 hours. The product was distilled to remove unreacted 2-methylthiophene and 45 parts by weight of clear, pale yellow viscous oil were recovered. This oil had a refractive index of 1.6081. The recovered distilled liquid was found to have the same refractive index as the 2-methylthiophene charged, indicating the absence of side reactions. This run exemplifies a method of continuous operation as opposed to batch operation.

Example XI

Into a reactor were placed 7 parts by weight of Super Filtrol and 50 parts by weight of 2-methylthiophene passed downward through the reactor over a period of 7 hours at a temperature of 95–100° C. The total product was collected and no recycle was used. On distillation of the material to remove 2-methylthiophene, 22 parts by weight of pale yellow, cloudy, viscous oil were recovered. This is a 44% yield. This run illustrates a continuous process.

Example XII 12 parts by weight of Super Filtrol and 36 parts by weight of 2-methylthiophene were charged to a reactor fitted with a stirrer to provide agitation. This quantity of material filled the reactor. Additional charge was added near the bottom of the reactor and liquid allowed to overflow at the top. A short settling zone at the top of the reactor was sufficient to return the solid catalyst to the reactor and allow only clear liquid to overflow. Over a period of 7 hours, 72.5 parts by weight of overflow material was collected, 39% by weight of this being viscous oil and 61% by weight 2-methylthiophene. This run illustrates a continuous process.

Example XIII 100 parts by weight thiophene, refractive index 1.5284, and 80 parts by weight Super Filtrol were mixed to form a mud and allow to stand at 75–80° C. The catalyst became dark green in color within a short time. After 3 days at 75–80° the mixture was cooled and petroleum ether and benzene added to form a slurry. The clay was filtered off. The filtrate was distilled to remove petroleum ether, benzene and thiophene and 30 grams of clear, light brown, very viscous oil were obtained. The refractive index of this oil was greater than 1.6343, the upper limit of the refractometer. On standing the product became discolored at the surface. The product was readily soluble in benzene. When the benzene solution was added to a conventional solvent-refined Mid-Continental mineral oil an immediate precipitation occurred, indicating that the product was only slightly soluble in the mineral oil.

Example XIV 100 parts by weight of 3-methylthiophene, refractive index 1.5200, and 20 parts by weight of Super Filtrol were stirred together for 25 days at 25–30° C., the refractive index of the liquid rising to 1.5237. On distillation of the product to remove 3-methylthiophene, 4 parts by weight of clear, light brown viscous oil having a refractive index 1.6058 were obtained. The purity of the starting material was confirmed by infrared absorption measurements, 99.1 mol % being 3-methylthiophene and 0.9 mol % 2-methylthiophene.

Example XV 100 parts by weight 3-methylthiophene and 114 parts by weight Super Filtrol were mixed and held at 75–80° for 5 days. At the end of this time the mixture was cooled to 30°. A hard cake formed. Benzene and acetone were added to form a slurry of the clay and dissolve the product. The clay was filtered off and the filtrate distilled to remove acetone, benzene and unreacted 3-methylthiophene. 81 parts by weight of a clear, light brown material, which set to a brittle resin at room temperature, was recovered. The product was only slightly soluble in mineral oil.

The large combined effect of catalyst to reactant ratio and temperature on yield is shown by Examples XIV and XV.

| Example | Example XIV | Example XV |
|---|---|---|
| Catalyst to Reactant Ratio | 0.20 | 1.14 |
| Temperature, °C | 25–30 | 75–80 |
| Time, Days | 25 | 5 |
| Yield, weight per cent | 4 | 81 |

Example XVI 100 parts by weight of 2,5-di-t-butylthiophene and 107 parts by weight of Super Filtrol were mixed to a mud and held at 80° for 6 days. Benzene was added to the reaction product to make a slurry and the clay filtered off. On distillation the benzene was removed and the entire quantity of di-t-butylthiophene was recovered. No viscous oil or other distillation residue was formed.

Example XVII 100 parts by weight of 2,5-di-t-butylthiophene and 51 parts by weight of Super Filtrol were stirred together at 174–183° C. for 14 hours. The mixture was then cooled and benzene added to make a slurry. The Super Filtrol was filtered off and the filtrate distilled to remove benzene and unreacted 2,5-di-t-butylthiophene. 16 parts by weight of a clear, brown, viscous oil were recovered.

In Examples XVIII and XXI the runs were made simultaneously to show the effect of typical natural and synthetic alumina-silica catalysts variously treated. In each case 100 parts by weight of t-butylthiophene were mixed with the catalyst and the whole allowed to stand 4 days at 80° C. Benzene was then added, the catalyst filtered off and the filtrate distilled to remove benzene and t-butylthiophene.

*Example XVIII*

The catalyst was the usual Super Filtrol as supplied by the manufacturer.

*Example XIX*

The Super Filtrol was heated at 1000° F. for 16 hours and then used.

*Example XX*

Socony-Vacuum alumina-silica bead catalyst as delivered off the drier was ground and the material passing through a 140-mesh screen used.

*Example XXI*

A catalyst similar to the above, but heated at 1050° F. was used.

When added to lubricating compositions, the products of this invention have been found capable of effecting improvement of the lubricating compositions, particularly with respect to their stability against oxidation, and their viscosity index. In concentrations ranging from 0.01% to 2%, they appear to be effective in stabilizing the lubricating compositions and in amounts ranging as high as 10% they appear useful for improving the viscosity index.

This invention includes lubricant compositions in which the basic ingredient is preferably a petroleum lubricating oil of the type normally used in internal combustion or turbine engines, but may be more viscous lubricants such as a heavy gear lubricant. Such lubricants may be derived from natural oils or a mineral source or prepared synthetically. To this basic material, the compositions described above are to be added in concentrations sufficient to effect an appreciable improvement in the characteristics of the basic material. Other addition agents adapted to improve the final mixture in the same or other respects may also be present in the lubricant composition.

This invention also includes lubricant concentrates, adapted to be added to further quantities of lubricant to improve its characteristics. The proportion of the composition described above to the base lubricant, in such concentrates, may be as great as 1 to 1, and, of course, is much greater than it will be in the final lubricating composition. Other addition agents may be present in these concentrates.

What is claimed is:

1. A mineral lubricating oil containing a minor proportion, sufficient to improve the viscosity index of said mineral lubricating oil, of a polymer of a material selected from the group consisting of thiophene and monoalkyl thiophenes, obtained by contacting said material with a silica-alumina catalyst, at a temperature falling within the range varying between about 20° C. and about 200° C. and for a period of time varying between about 1 hour and about 20 days.

2. A mineral lubricating oil containing between about 0.01% and about 2% of a polymer of a material selected from the group consisting of thiophene and monoalkyl thiophenes, obtained by contacting said material with a silica-alumina catalyst, at a temperature falling within the range varying between about 20° C. and about 200° C. and for a period of time varying between about 1 hour and about 20 days.

3. A mineral lubricating oil containing between about 0.01% and about 10% of a polymer of thiophene obtained by contacting said thiophene with a silica-alumina catalyst, at a temperature falling within the range varying between about 20° C. and about 200° C. and for a period of time varying between about 1 hour and about 20 days.

4. A mineral lubricating oil containing between about 0.01% and about 10% of a polymer of 3-methyl thiophene obtained by contacting said 3-methyl thiophene with a silica-alumina catalyst, at a temperature falling within the range varying between about 20° C. and about 200° C. and for a period of time varying between about 1 hour and about 20 days.

5. A mineral lubricating oil containing between about 0.01% and about 10% of a polymer of 2-methyl thiophene obtained by contacting said 2-methyl thiophene with a silica-alumina catalyst, at a temperature falling within the range varying between about 20° C. and about 200° C. and for a period of time varying between about 1 hour and about 20 days.

6. A mineral lubricating oil containing between about 0.01% and about 10% of a polymer of 2-t-butyl thiophene obtained by contacting said 2-t-butyl thiophene with a silica-alumina catalyst, at a temperature falling within the range varying between about 20° C. and about 200° C. and for a period of time varying between about 1 hour and about 20 days.

GEORGE C. JOHNSON.

REFERENCES CITED

The following references are of record in the file of this patent:

UNITED STATES PATENTS

| Number | Name | Date |
|---|---|---|
| 2,160,293 | Shoemaker | May 30, 1939 |
| 2,364,382 | Morway | Dec. 5, 1944 |
| 2,398,271 | Zimmer et al. | Apr. 9, 1946 |

OTHER REFERENCES

Fredenhagen: Zeit Physik Chem., 1933, page 190, lines 16–25.